United States Patent
Milicevic et al.

(10) Patent No.: US 11,148,967 B2
(45) Date of Patent: Oct. 19, 2021

(54) METHOD AND SYSTEM FOR MANUFACTURING AN OPTICAL FIBER PREFORM

(75) Inventors: Igor Milicevic, Helmond (NL); Mattheus Jacobus Nicolaas van Stralen, Tilburg (NL); Johannes Antoon Hartsuiker, Eindhoven (NL); Roland Heuvelmans, Eindhoven (NL)

(73) Assignee: DRAKA COMTEQ B.V., Amsterdam (NL)

(*) Notice: Subject to any disclaimer, the term of this patent is extended or adjusted under 35 U.S.C. 154(b) by 1373 days.

(21) Appl. No.: 12/689,394

(22) Filed: Jan. 19, 2010

(65) Prior Publication Data
US 2010/0180639 A1 Jul. 22, 2010

(30) Foreign Application Priority Data
Jan. 16, 2009 (NL) .......................... 200222

(51) Int. Cl.
*C03B 37/018* (2006.01)

(52) U.S. Cl.
CPC .... *C03B 37/01869* (2013.01); *C03B 2201/31* (2013.01)

(58) Field of Classification Search
CPC .......... C03B 37/01869; C03B 37/0144; C03B 37/01846
USPC .................... 65/377, 484, 428, 419
See application file for complete search history.

(56) References Cited

U.S. PATENT DOCUMENTS

| | | | | |
|---|---|---|---|---|
| 4,317,668 A | * | 3/1982 | Susa et al. | 65/17.2 |
| 4,578,253 A | * | 3/1986 | Gill | B01D 33/0096 210/196 |
| 4,632,684 A | | 12/1986 | Karbassiyoon et al. | |
| 4,816,050 A | * | 3/1989 | Roba | C03B 37/01807 65/161 |
| 5,755,840 A | * | 5/1998 | Beer | 48/127.3 |
| 5,890,376 A | * | 4/1999 | Chludzinski | B01D 53/00 62/608 |
| 6,105,396 A | | 8/2000 | Glodis et al. | |
| 6,131,413 A | | 10/2000 | Rousseau et al. | |
| 6,484,538 B1 | | 11/2002 | Regnier et al. | |
| 6,870,999 B2 | * | 3/2005 | Allan | C03B 37/01413 385/123 |
| 2003/0115908 A1 | | 6/2003 | Hammerle et al. | |

(Continued)

OTHER PUBLICATIONS

European Search Report for EP 10 15 0896 dated Apr. 23, 2010.
Netherlands Search Report for NL 2002422 dated Sep. 2, 2009.

*Primary Examiner* — John M Hoffmann
(74) *Attorney, Agent, or Firm* — Leydig, Voit & Mayer, Ltd.

(57) ABSTRACT

A method is described for manufacturing an optical fiber preform, including a tube collapsing phase, and including monitoring the concentration of at least one fluid component of a fluid that is exhausted from the tube, to detect structural integrity of the tube. A system is also described for manufacturing optical fiber preforms. The system comprising a holder configured to hold a tube, a heater configured to heat at least part of the tube to a tube collapsing temperature, a fluid exhaust configured to discharge fluid from the tube, held by the holder. The system also includes a tube integrity monitor configured to monitor structural integrity of the tube, during a collapsing phase, by monitoring fluid that is discharged from the tube.

12 Claims, 1 Drawing Sheet

(56) References Cited

U.S. PATENT DOCUMENTS

| | | | |
|---|---|---|---|
| 2004/0050094 A1* | 3/2004 | Thonnelier | C01B 21/0444 62/617 |
| 2005/0092029 A1* | 5/2005 | Han | C03B 37/01433 65/390 |
| 2006/0216527 A1* | 9/2006 | Fletcher, III | C03B 37/01211 428/432 |
| 2009/0272716 A1* | 11/2009 | Bookbinder | C03B 37/01466 216/24 |

* cited by examiner

METHOD AND SYSTEM FOR MANUFACTURING AN OPTICAL FIBER PREFORM

FIELD OF THE INVENTION

The invention relates to a method and system to manufacture an optical fiber preform.

BACKGROUND

One of the steps in production of glass optical fibers is a so called collapse phase. During this phase, a deposited glass tube is contracted in a contraction machine to a glass rod (also known as an optical fiber preform), utilizing a heat source. The contraction machine is generally known as a collapser. The machine has a heat source at a temperature higher than a melting temperature of the deposited glass tubes (above 2000 degrees Celsius). Suitable heat sources for collapsing the glass tubes include hydrogen/oxygen burners, plasma burners, electrical resistance furnaces, and induction furnaces.

Unfortunately, the tube can break during the collapsing process. The broken glass can severely damage the collapser heat source. This will often lead to costly reparation of the heat source as well as the adjustment of the collapse recipe. This causes further process stability problems.

The problem is especially urgent for products with higher germanium content (e.g., a product having a delta refractive index higher than 0.5% between the substrate tube and the deposited layers).

SUMMARY OF THE INVENTION

The present invention provides a solution for the above-mentioned problem. According to the invention, a method for manufacturing an optical fiber preform is characterized by monitoring the concentration of at least one fluid component of a fluid that is exhausted from the tube during the collapsing thereof to detect structural integrity of the tube.

Thus, any structural degradation of the tube, particularly, breakage, can be detected swiftly and reliably. The present method can be implemented without requiring undesirably complex modifications to a collapser system which is to carry out the method.

For example, the fluid can be a fluid that is fed through the tube during operation, for example oxygen or an inert gas. Also, according to an embodiment, an alarm signal is generated upon detection of a change in the concentration of the fluid component (with respect to a predetermined concentration of the component in the fluid), particularly a change of at least 10%, and more particularly at least 50%.

According to a further preferred embodiment, the method can include moving a heat source along a longitudinal direction of the tube, preferably several times back and forwards along the tube, the heat source heating the tube to a softening temperature. For example, the heat source can be maintained at a temperature above a softening temperature of the tube for softening the tube, and/or the heat source can locally heat the tube to said softening temperature.

Also, an embodiment of the invention provides a system for manufacturing optical fiber preforms, the system comprising:
 a holder configured to hold a tube;
 a heater configured to heat at least part of the tube to a tube collapsing temperature; and
 a fluid exhaust configured to discharge fluid from the tube, held by the holder.

The system comprises a tube integrity monitor configured to monitor structural integrity of the tube, during a collapsing phase, by monitoring fluid that is discharged from the tube.

BRIEF DESCRIPTION OF THE DRAWINGS

The invention will now be further elucidated by means of, non-limiting, examples referring to the drawing, in which.

In the present application, the same or corresponding features are denoted by the same or corresponding reference signs.

DETAILED DESCRIPTION OF THE DRAWINGS

Figure 1:
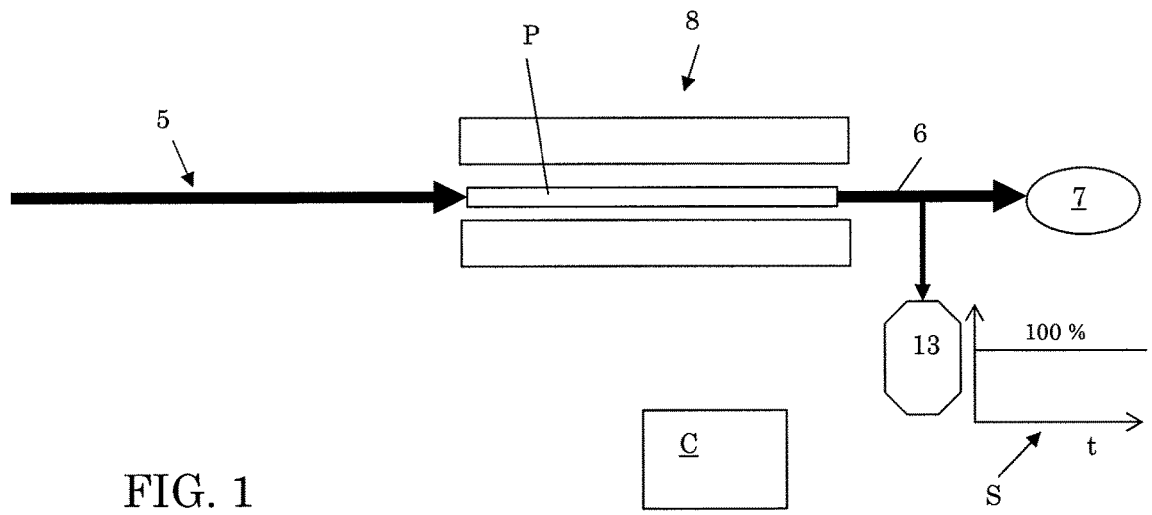
FIG. 1 schematically shows a non-limiting example of a system and method according to the invention.

FIG. 1 depicts a system for collapsing tubes (P) to manufacture optical fiber preforms. Particularly, the collapsing at least involves a radial shrinking of a tube P.

The tube P for manufacturing the preform, known per se from the prior art, is a cylindrical glass (silica) tube, an inner side of the tube particularly being provided with one or more cladding layers (for example doped and/or undoped silica layers) and one or more core material layers (for example doped silica, particularly Germanium doped silica, the doping increasing the refractive index of the silica). Various dopants, and doping profiles, may be used in the core and cladding layers; generally, the core material will have a higher refractive index than the cladding material. The coated tube as such may be manufactured, for example, using a Chemical Vapor Deposition process, for example PCVD, MCVD, or FCVD, or in a different manner, as will be appreciated by those skilled in the art.

The present system includes a holder 8 configured to hold the preform tube P (in a horizontal orientation), and a heater configured to heat at least part of the tube to a tube collapsing (i.e. softening) temperature. The holder and heater can be configured in various ways. In the drawing, the holder and heater (for example a torch, a furnace) are jointly designated by reference sign 8; they can be jointly called a tube collapser 8. Preferably, the collapser is configured to iteratively move a heat source along a longitudinal direction of the tube P, wherein the heat source is configured to locally heat the tube to a temperature above a softening temperature of the tube.

For example, as will be appreciated by the skilled person, the holder may be configured to rotate the tubular tube P (about a respective centre line), wherein the heater is movable along the tube P to provide local tube collapsing. During operation, substantially the entire tube P can be softened by the heater (iteratively moving there-along) and collapses (without changing a rodlike cylinder-shape).

Preferably, a fluid supply system 5 is provided to supply a fluid (in particular a gas or gas mixture) to the tube P, particularly to hold the interior at a certain operating pressure and to prevent moisture entering the tube. The fluid (for example a fluid of a single substance, or a mixture of different substances) is fed through the tubular tube during at least part of the collapsing phase. Particularly, the fluid can be pure oxygen ($O_2$), or an inert gas. Usually, the fluid has a different composition than fluid present in an environment (usually air) of the tube P.

The fluid is fed through the fiber tube P and is discharged there-from by an exhaust system 6. A pump 7 is provided (the pump for example being part of the exhaust system) to pump the fluid from the interior of tube P.

During at least part of the process, the fluid may contain an etchant for etching part of the core material. For example, the fluid component for etching the tube can be a fluor-containing substance or Chlorofluorcarbon, for example Hexafluoroethane ($C_2F_6$) or HF. In this way, deposition of impurities can be prevented, and any under-doped outer core layers can be removed, so that a fiber core of high purity, having desired optical properties, can be achieved.

The collapser system advantageously comprises a tube integrity monitor configured to monitor structural integrity of the tube during the collapsing thereof. The monitor is associated with the pump 7, and comprises a detector 13 configured to detect a concentration of at least one component of fluid, discharged from the tube P. In the example, the detector 13 generates a detector signal S relating to the detected concentration. For example, in a case where the fluid is an oxygen gas, the detector can be an oxygen concentration detector. Preferably, the tube integrity monitor is configured to generate an alarm signal in case tube integrity degradation is detected, for example when a certain drop of the concentration of the fluid component is sensed by the detector 13.

In the example, the integrity monitor includes a processing unit, for example data processor, microcontroller, computer, or a similar processing unit, schematically indicated by reference sign C, configured to process detector signals S. Processing unit C and detector 13 are jointly called a "fluid analyzer". The processing unit C can be part of a control unit of the tube collapser. The processing unit C can be configured to generate the afore-mentioned alarm signal, particularly in case the processing unit C detects certain deviations in the detector signal S with respect to an expected second detector signal (the deviations indicating undesired structural degradation of the tube P, such as breakage). Also, optionally, a tube collapsing process can be interrupted automatically by the processing unit C in case such degradation is detected.

During operation, the tube P is being collapsed by the collapser 8. The fluid (for example pure oxygen) is fed to the collapsing tube P, and is pumped away via the exhaust system 6 and respective pump 7. The fluid that is fed to the tube P may consist of a substance that is monitored by the downstream detector 13. In that case, the concentration of the substance in the fluid is 100%. In an alternative embodiment, the fluid is a mixture of several components, wherein part of the fluid consists of a substance monitored by the concentration detector 13.

The fluid analyzer, including the detector 13 and processing unit C analyzes the fluid that is discharged from the tube P, particularly to detect the concentration of the fluid component. As follows from FIG. 1, in case the tube P is structurally intact, the concentration of the substance in the discharged fluid will not substantially differ from the concentration upstream of the tube P (for example a concentration of 100%, in cases where the fluid consists of a single substance).

Figure 2:
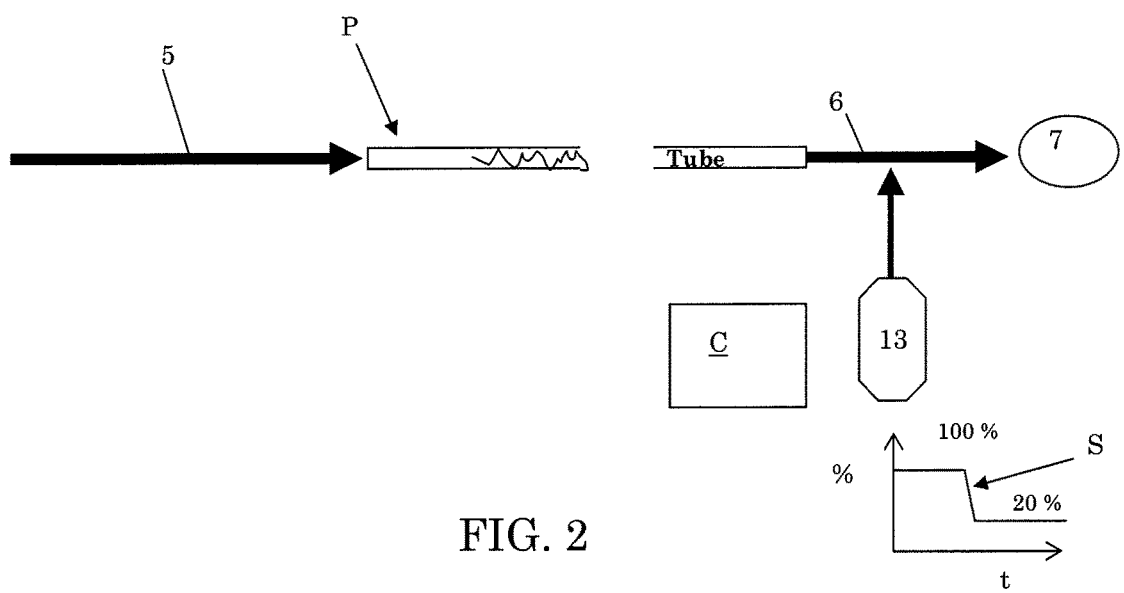
FIG. 2 shows part of the system and method, after tube breakage.

In case of a tube breakage, the fluid fed to the tube will not reach the downstream detector 13 and externally available fluid (for example air) is sucked into the downstream part of the broken tube (see FIG. 2). This leads to a sudden change in fluid composition of the fluid emanating from the tube, which can be detected swiftly by the analyzer system 13, C, preferably within 30 seconds after the breakage.

For example, in a case where the fluid fed by the supply system 5 to the tube P consists of oxygen (concentration=100%), the detector 13 will detect a deviation, more particularly a drop, of monitored oxygen from a predetermined concentration of 100% to about 20% (which is the concentration of oxygen in air). The large drop from a concentration of 100% to less than 50%, particularly to about 20%, can be detected very accurately.

Upon detecting the concentration change, the processing unit C preferably generates an alarm signal (for example to turn on an alarm signaling device, such as a siren and/or warning light), and may even automatically abort the collapsing process.

By providing a swift tube breakage detection mechanism, severe damage to the collapser 8 can be prevented. Besides, as an advantageous side-effect, any undesired air leakage into the fluid supply part 5 can be detected as well, particularly in the case where the analyzer part, including detector 13 and processing unit C, monitors the oxygen concentration in the discharged fluid.

Implementation of the present solution is relatively inexpensive. Furthermore, it is expected that the present solution is a very robust and fast method for the tube breakage detection.

In the foregoing specification, the invention has been described with reference to specific examples of embodiments of the invention. It will, however, be evident that various modifications and changes may be made therein without departing from the broader spirit and scope of the invention as set forth in the appended claims.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

For example, the method can include application of one or more etching phases, wherein the fluid includes an etchant for etching part of the core material. An afore-mentioned etching phase may be part of an overall tube collapsing phase. An etching phase may involve feeding pure etchant into the tube P, or feeding a mixture comprising oxygen, or an inert gas, and etchant to the tube P. The tube integrity monitor is preferably configured to take into account such etching steps (if any), when monitoring the fluid to detect tube breakage, to avoid false alarms.

Also, an embodiment can comprise monitoring that includes detecting presence of air. For example, a detector located downstream with respect to the tube P can be configured to detect nitrogen in fluid that is exhausted from the tube P.

What is claimed is:

1. A method for detecting a breakage of a coated glass tube during manufacturing an optical fiber preform glass rod from the coated glass tube having an interior that, during the manufacturing, is collapsed to form the optical fiber preform glass rod, the method for detecting the breakage comprising:

feeding a fluid through the interior of the coated glass tube and discharging the fluid from the interior of the coated glass tube by an exhaust system;

monitoring the fluid discharged from the interior of the coated glass tube; and collapsing, during the monitoring, the coated glass tube, wherein the monitoring comprises:

sensing a concentration of a specific single fluid component of the fluid exhaust flow during the collapsing, and detecting, based on the sensing a concentration, a deviation by the concentration from a predetermined concentration, the deviation indicating a breakage of the coated glass tube during the collapsing.

2. The method according to claim 1, wherein, during the collapsing, the fluid is fed into the coated glass tube and pumped from the interior of the coated glass tube to provide the fluid discharged from the interior of the coated glass tube.

3. The method according to claim 1, wherein the monitoring includes monitoring for presence of air in the fluid discharged from the interior of the coated glass tube.

4. The method according to claim 1, wherein the sensing the concentration of the specific single fluid component includes detecting a concentration of oxygen in the fluid discharged from the interior of the coated glass tube.

5. The method according to claim 1, wherein the sensing the concentration of the specific single fluid component includes detecting a concentration of an inert gas in the fluid discharged from the interior of the coated glass tube.

6. The method according to claim 1 wherein the deviation by the concentration from the predetermined concentration is at least 10%.

7. The method according to claim 1 wherein the deviation by the concentration from the predetermined concentration is at least 50%.

8. The method of claim 1 further comprising:
aborting, in response to the detecting the deviation indicating the breakage of the coated glass tube, the collapsing.

9. The method of claim 1, further comprising: generating an alarm signal in response to the detecting.

10. A method for detecting a breakage of a coated glass tube during manufacturing an optical fiber preform glass rod from the coated glass tube that is collapsed to form the optical fiber preform glass rod, the method comprising:
feeding a fluid through the coated glass tube and discharging the fluid from the coated glass tube by an exhaust system; and
monitoring the fluid discharged from the coated glass tube; and
collapsing, during the monitoring, the coated glass tube, wherein the monitoring comprises:
detecting a breakage of the coated glass tube during the collapsing at least by detecting a change in composition of the fluid discharged from the coated glass tube, and
generating, in response to the detecting, an alarm signal.

11. The method according to claim 10 wherein the detecting the change in composition occurs within 30 seconds after the breakage.

12. The method of claim 10, further comprising: generating an alarm signal in response to the detecting.

* * * * *